United States Patent Office.

ADOLF FLÜGGE, OF FRANKFORT-ON-THE-MAIN, GERMANY.

SOLUTION OF MYRRH-RESIN AND MODE OF MAKING THE SAME.

SPECIFICATION forming part of Letters Patent No. 479,935, dated August 2, 1892.

Application filed May 13, 1892. Serial No. 432,860. (Specimens.) Patented in France November 11, 1890, No. 209,436, and in England April 13, 1891, No. 6,306.

*To all whom it may concern:*

Be it known that I, ADOLF FLÜGGE, a subject of the Emperor of Germany, and a resident of Frankfort-on-the-Main, Germany, have invented new and useful Improvements in the Manufacture of Myrrh Solutions, of which the following is a specification, and for which I have obtained a French patent, No. 209,436, dated November 11, 1890, and an English patent, No. 6,306, dated April 13, 1891.

Myrrh is a gum-resin consisting of about three per cent. of ether-oil, of about thirty to thirty-five per cent. of resin, and of about sixty-five per cent. of gum, (Arabin, Bassorin, sundry salts, and impurities, such as sand, &c.,) which is soluble in water.

All recent works on pharmacy and chemistry state that myrrh-resin is insoluble in fatty oils or say nothing at all about it. In Berzelius' instruction-book (translated by Von Wohler in 1820, and published at Dresden by Von Arnoldi) it is, moreover, stated that myrrh-resin is insoluble in fatty and liquid oils. There is only the observation that the resin extracted from myrrh by alcohol is treated after separation of the alcohol with ether, which dissolves five per cent. of soft resin, and this is only partially soluble in oil of almonds. Of the so-called "resins" myrrh-resin was almost never dissolved, this resin amounting to about twenty-five per cent. of the myrrh, and was considered to be a myrrhic acid.

The present invention is based upon my discovery that although myrrh-resin is not directly soluble in mere castor-oil a solution of it may be obtained in that oil by the introduction of a small quantity of alcohol, and such solution remains permanent after the alcohol has been driven off by evaporation.

The process of dissolving myrrh-resin according to my invention is as follows: The myrrh is powdered and has poured over it castor-oil in about the proportions of one part, by weight, of myrrh and one part of castor-oil, and alcohol is added in the proportion of about one-fifth of the oil employed. The whole is digested in a closed receptacle, wherein it is subjected to frequent stirring. After eight days the solution of the resin is perfectly attained. The solution is then filtered off from the remaining gum and constituents of the myrrh, which are insoluble in alcohol, and the alcohol is driven off by evaporation produced by the application of gentle heat. The process may also be varied in that the myrrh-resin is extracted with alcohol, and the alcoholic solution so obtained is then treated with castor-oil, the alcohol being subsequently evaporated by distillation. In this case, also, a clear solution of myrrh-resin in castor-oil is obtained.

The solution is perfectly clear, of a light brown color, of an agreeable aromatic smell, and of the spicy bitter taste of myrrh.

The identity of the myrrhic resin can be established by means of nitric acid.

The solution obtained by this process may also be diluted with other oils or fats and can be employed for embalming and preserving purposes. An alcoholic solution is not adapted for such purpose, since the resins of the myrrh as soon as they come in contact with watery liquids separate out, an impregnation being therefore impossible.

What I claim as my invention, and desire to secure by Letters Patent, is—

1. The process of manufacturing a solution of myrrh-resin in castor-oil, consisting in first dissolving myrrh in alcohol and castor-oil, next filtering the solution from the constituents of the myrrh, which are insoluble in alcohol, and finally driving off the alcohol, substantially as set forth.

2. As a new article of manufacture, a clear solution of myrrhic resin in castor-oil.

In testimony whereof I have signed my name to this specification in the presence of two subscribing witnesses.

ADOLF FLÜGGE.

Witnesses:
   FRIEDRICH CÖRRELL,
   ALVESTO S. HOGUE.